(12) United States Patent
 Nester

(10) Patent No.: US 11,484,004 B2
(45) Date of Patent: Nov. 1, 2022

(54) DEMOUNTABLE ALLEY STOP FOR LIVESTOCK PROCESSING ALLEYS

(71) Applicant: Nester Livestock Equipment Ltd., Vulcan (CA)

(72) Inventor: Jack Nester, Vulcan (CA)

(73) Assignee: NESTER LIVESTOCK EQUIPMENT LTD., Alberta (CA)

(*) Notice: Subject to any disclaimer, the term of this patent is extended or adjusted under 35 U.S.C. 154(b) by 0 days.

(21) Appl. No.: 17/138,135

(22) Filed: Dec. 30, 2020

(65) Prior Publication Data

US 2022/0142112 A1 May 12, 2022

(30) Foreign Application Priority Data

Nov. 12, 2020 (CA) ..................................... 3098851

(51) Int. Cl.
 *A01K 1/00* (2006.01)
(52) U.S. Cl.
 CPC .................................. *A01K 1/0029* (2013.01)
(58) Field of Classification Search
 CPC .. A01K 1/0029; A01K 1/0017; A01K 1/0023; A01K 3/002; A01K 1/0209
 USPC ............................................. 49/386; 119/502
 See application file for complete search history.

(56) References Cited

U.S. PATENT DOCUMENTS

| | | | | | |
|---|---|---|---|---|---|
| 3,079,711 | A | * | 3/1963 | Turner | A01K 1/0017 119/840 |
| 3,785,346 | A | * | 1/1974 | Dower | A01K 1/0209 119/524 |
| 3,866,356 | A | * | 2/1975 | La Cook | E06B 11/02 49/386 |
| 3,894,516 | A | * | 7/1975 | Schaefer | A01K 1/0023 119/840 |
| 4,261,297 | A | * | 4/1981 | Van Maarion | A01K 1/0023 119/840 |
| 5,463,984 | A | * | 11/1995 | Hubbard | A01K 3/00 119/840 |
| 6,513,459 | B2 | | 2/2003 | Linn | |
| 7,216,605 | B2 | * | 5/2007 | Cupps | B60P 3/04 280/491.1 |
| 7,640,891 | B2 | | 1/2010 | Van | |
| 9,259,009 | B2 | | 2/2016 | Callicrate | |

(Continued)

*Primary Examiner* — Monica L Perry
*Assistant Examiner* — Katherine Anne Kloecker
(74) *Attorney, Agent, or Firm* — Billion & Armitage

(57) ABSTRACT

A demountable alley stop for preventing livestock from backing up in process alleys, includes a deflectable triangular arm component hingedly engaged with an alley stop framework wherein the resting position of the triangular arm component extends into the process alley. The triangular arm component comprises a rearward-facing deflection arm component engaged at its distal end to the distal end of a forward-facing backstop arm component. The proximal ends of the deflection arm component and the backstop arm component are engaged with a bracing arm component. The juncture of the deflection arm component and the backstop arm component is provided with a resilient pliable hose for contacting process alley side rails when the triangular arm component is deflected out of the process alley. The alley stop framework is provided with a resilient hose to stop the bracing arm component when the triangular arm component returns to its resting position.

13 Claims, 10 Drawing Sheets

(56) References Cited

U.S. PATENT DOCUMENTS

| | | | |
|---|---|---|---|
| 10,327,416 B1* | 6/2019 | Studebaker, Jr. | A01K 1/0029 |
| 10,499,611 B2 | 12/2019 | Coker | |
| 10,524,448 B2 | 1/2020 | Hager | |
| 11,278,002 B2* | 3/2022 | Fournier | A01K 1/0613 |
| 2008/0163819 A1* | 7/2008 | Sensenig | A01K 1/0017 |
| | | | 119/518 |
| 2009/0173285 A1* | 7/2009 | Rasmussen | A01K 1/0017 |
| | | | 119/502 |
| 2018/0042200 A1* | 2/2018 | Gipson | A01K 1/0613 |
| 2018/0116171 A1* | 5/2018 | Beavers | A01K 1/0613 |
| 2019/0008115 A1* | 1/2019 | Coker | A01K 1/0029 |
| 2019/0191666 A1* | 6/2019 | Amos | A01K 1/0029 |
| 2020/0375150 A1* | 12/2020 | Hicks | A01K 1/0017 |

\* cited by examiner

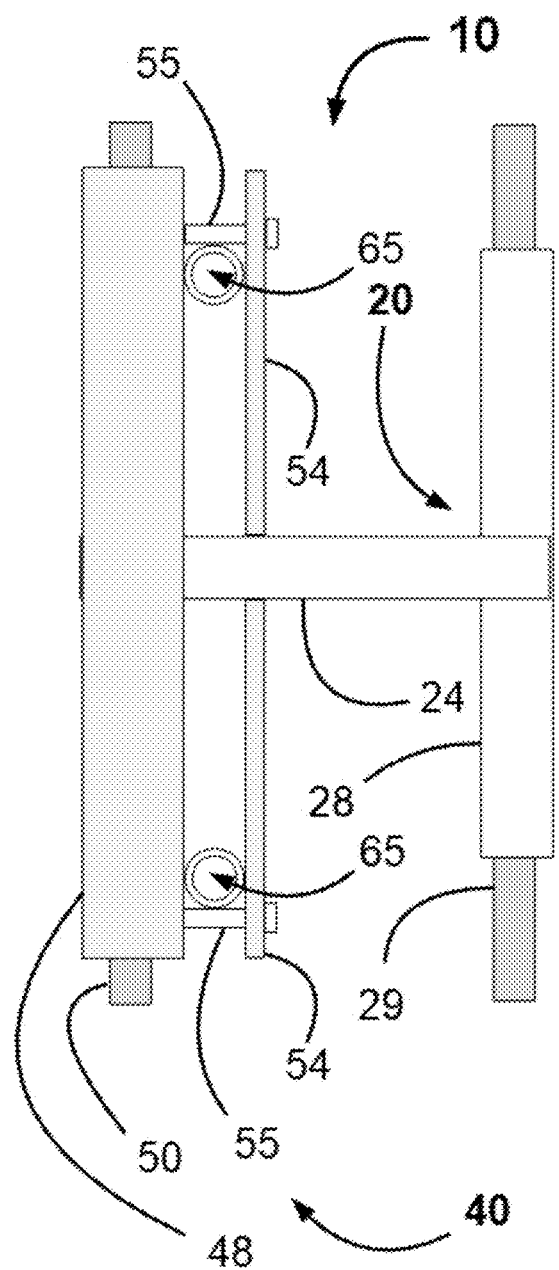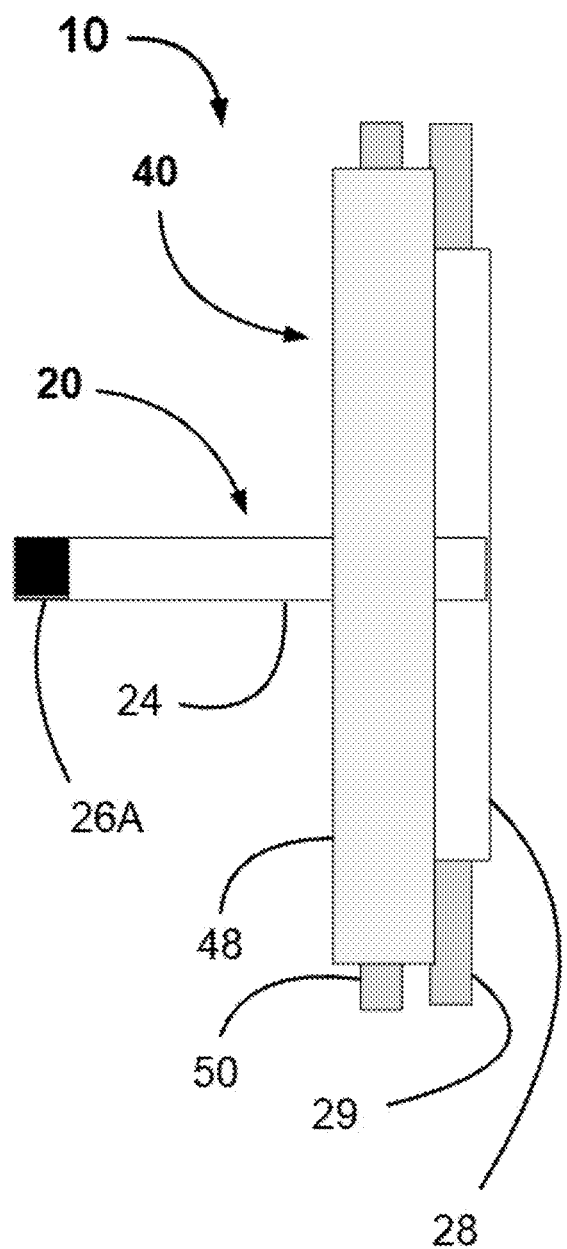

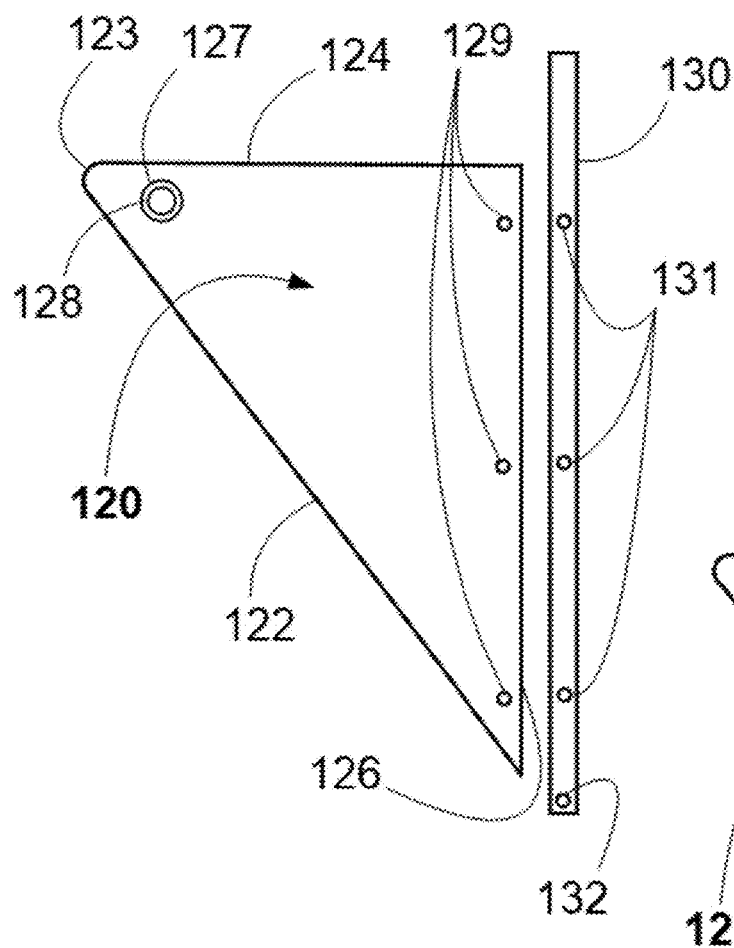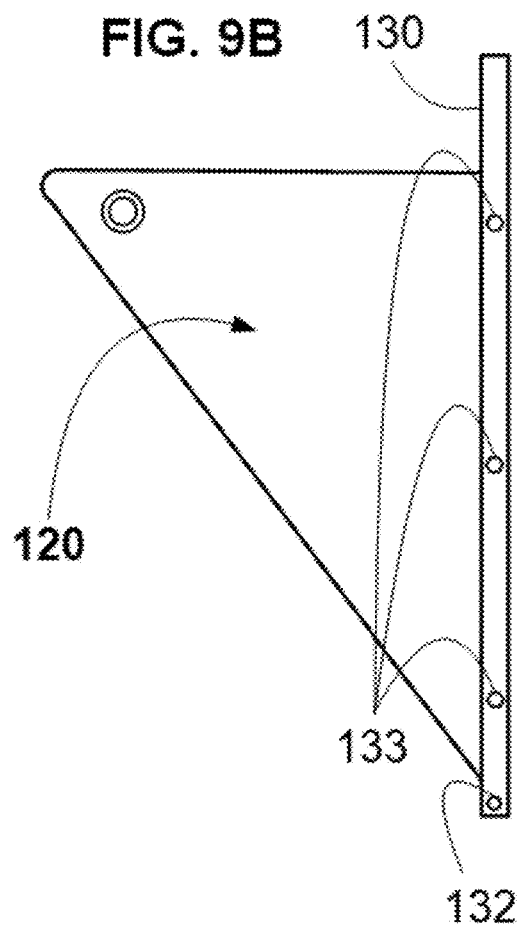

DEMOUNTABLE ALLEY STOP FOR LIVESTOCK PROCESSING ALLEYS

TECHNICAL FIELD

This disclosure generally relates to livestock processing alleys. More specifically, this disclosure pertains to demountable alley stops for preventing cattle from backing up in process alleys.

BACKGROUND

Livestock processing alleys are corridors constructed for herding livestock such as cattle, pigs, sheep, and the like from one location to another. Conventional processing alleys typically comprise temporary or semi-permanent metal gates or members spaced closely together such that only one animal may pass through comfortably at a time. As a result, the livestock are herded single-file which encourages them to individually move only in a forward direction.

However, in some cases, individual livestock may be motivated to back up in the processing alley. For example, if one of the livestock animals is scared or startled, they may be motivated to stop and subsequently back up in the processing alley, which may in turn, cause any animals behind them to also back up.

In order to prevent livestock animals passing through processing alleys from backing up, alley stops which function as one-way gates, may be installed therein. Conventional alley stops may be divided into two categories, namely over-the-back stops and side-of-alley stops. Over-the-back stops are installed above the alley and include an arm that extends downwardly into the alley, with the arm being pivotable upward in the direction of the flow of livestock through the alley. As individual livestock animals move through the alley, they contact the arm with their backs, pushing it upwards and out of the alley so that they may continue therethrough. After each animal passes under the arm, the arm drops back to its initial position by way of gravity or a spring, thereby preventing the animal from backing up in the alley.

Side-of-alley stops are installed on an inner side member of the processing alley and function in a similar manner to over-the-back stops. In more detail, side-of-alley stops include an arm or a "fin" (i.e. an arm having an oblong shape) that extends perpendicularly into the alley and is pivotable in the direction of the flow of livestock animals through the alley. As individual animals move through the alley, the arm is pushed forward such that it moved out of the way of the animal. Similar in function to the over-the-back stop, once an animal passes through the side-of-alley stop, the arm returns to its initial position, thereby preventing the animal from moving backwards in the alley.

However, the conventional alley stops have a number of disadvantages. For example, the conventional stops, due to their position in the alley, may stall cattle from moving forward, while also producing a significant amount of clattering and clanging noises as the arms move back and forth. As well, the positioning of the over-the-back stops in processing alleys need to be adjusted for livestock having different heights to pass thereunder. Side-of-alley stops may injure the legs or chests of moving livestock when they bounce back into the alley.

SUMMARY

Embodiments of the present disclosure generally relate to demountable alley stops for preventing livestock animals from backing up in process alleys. In more detail, the present disclosure relates to alley stops configured for reducing the occurrence of injuries to animals moving through process alley and also, significantly reduces incidents and volumes of noise produced as animals pass by the alley ways.

One example embodiment of the present disclosure pertains to demountable alley stop for preventing livestock animals from backing up in a process alley. The alley stop comprises a deflectable triangular arm component biased to extend into the process alley when the alley stop is in a resting position. The triangular arm component comprises a deflection arm connected at one end to a backstop arm component, and at its other end to a bracing arm component. The bracing arm component is demountably and hingedly engageable with an outer side member of a process alley. An animal passing through the process alley will contact the deflection arm component of the triangular arm component with its chest to thereby move the triangular arm component out of the process alley to allow the animal to continue its forward movement through the process alley. After the rear quarter of the animal has passed by the triangular arm component, a biasing spring returns the triangular arm component back to its resting position that protrudes the backstop arm component into the process alley. The rear quarter of an animal attempting to back up in the process alley will come into contact with the backstop arm component that prevents any further backward movement attempts by the animal.

BRIEF DESCRIPTION OF THE FIGURES

The embodiments of the present disclosure will be described with reference to the following drawings in which:

FIG. 5 are rearward views of the alley stop shown in FIG. 1, in a closed position (FIG. 5A) and in an open position (FIG. 5B);

FIG. 8 are top views of a process alley having an alley stop according to an embodiment of the present disclosure installed therein, wherein

DETAILED DESCRIPTION

Figure 1:
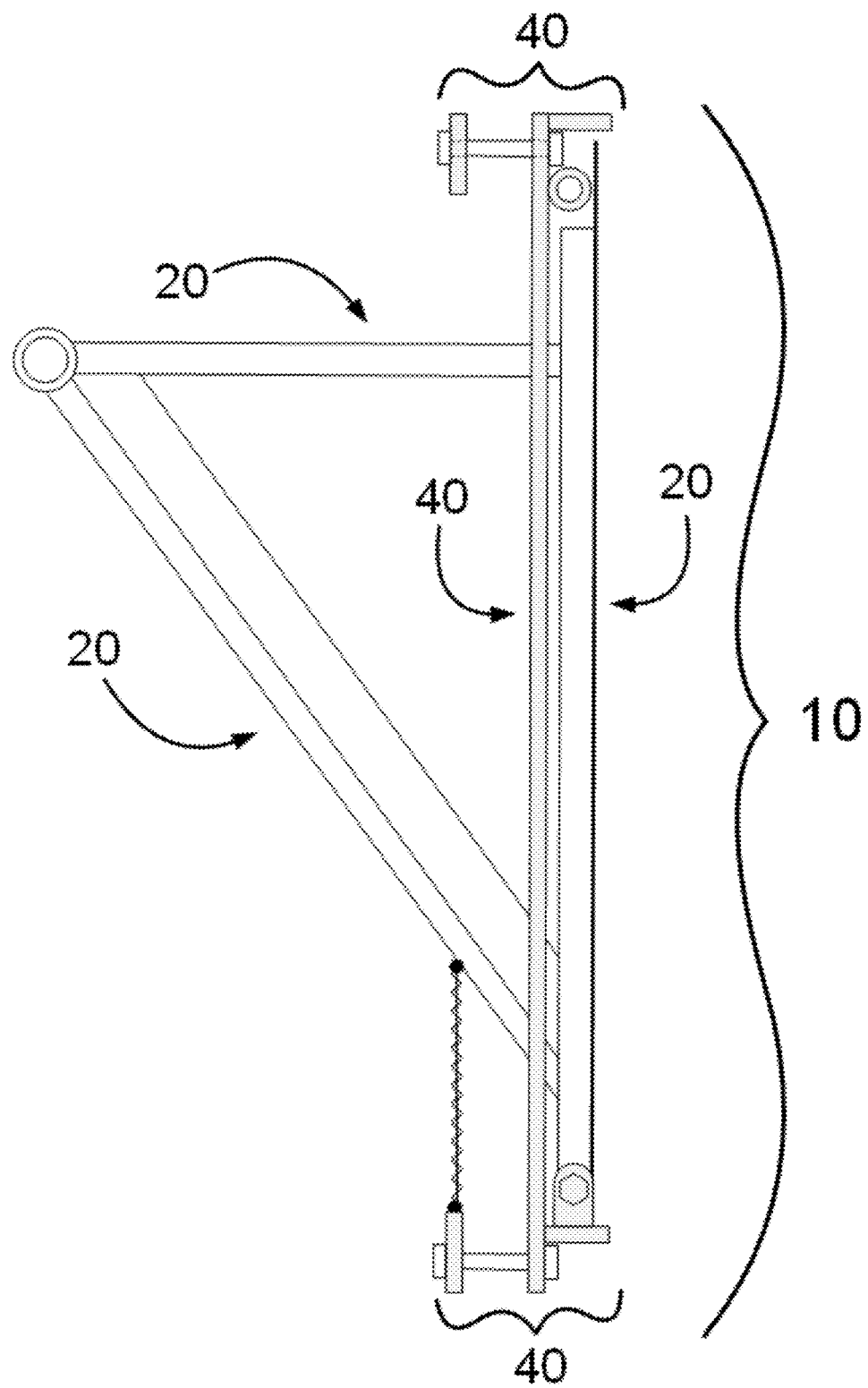
FIG. 1 is a top view of the components comprising an example of an alley stop according to one embodiment of the present disclosure, shown in a closed position.

The embodiments of the present disclosure generally relate to demountable alley stops for preventing livestock from backing up in a process alley. In more detail, the present disclosure relates to demountable alley stops configured for reducing chances of injury to animals moving through the process alley as well as for significant reduction of mechanical noises produced while animals are passing by the alley stops.

The alley stops of the present disclosure may have a number of advantages. For example, one advantage of the alley stops of the present disclosure includes the capability to passively control attempts of livestock animals to back up while they are moving through forward a process alley without risk of injury to the animals. As will be described in greater detail below, a rearward-facing deflection arm component of the triangular arm component of an example alley stop that protrudes into a process alley when at rest, is easily deflected sideways out of the process alley when contacted by a shoulder or upper leg sections of an animal moving forward in a manner such that the animal's forward momentum is not restricted or hindered in any way, thereby avoiding bruising injuries to the animals passing through the process alley. After the animal completely passes by the alley stop, the triangular arm component is quickly and quietly returned to its resting position during which a sturdy forward-facing backstop arm component protrudes into the process alley and is configured to prevent any rearward motion beyond the resting position of the alley stop.

The alley stops disclosed herein may be demountably engaged with a side member of a process alley at a selected height whereby the deflection arm component remains in contact with a passing animal's body from its front quarter section and along the side of its body until the passing animal's rear quarter passes by the alley stop, after which, the alley stop returns to its resting protruding position within the process alley.

Conventional alley stops are typically formed of a number of metal components that may cause significant amounts of noise by clashing against each other as the alley stops are opened and closed by individual animals passing therethrough. The loud and continuous banging and clanging noises created by the conventional alley stops during use, may startle and stress individual animals there causing them to stop abruptly and try to back up and out of the process alleys may provide added stress to the livestock in the alley, which may, in turn, cause them to stall. Another advantage of the alley stops of the present disclosure is that they are configured to operate quietly with minimal noise as a plurality of livestock animals pass through a process alley in single file. According to some aspects, the rearward-facing deflection arm components and the forward-facing backstop arm components of the triangular arm component, may be covered with padding materials to cushion the alley stops contacts with animals during deflection and stopping backward movements. According to some aspects, the padding materials may be replaceable components. According to some aspects, the padding materials may be demountably engaged with the deflection arm component and the backstop arm component surfaces. According to some aspects, the animal-contact sections of the deflection arm components and the backstop arm components can be made of resilient deformable and/or compressible materials that return to their original shape and configuration after contact with animals passing thereby. Use of such padding and/or resilient materials for the animal-contact components of the present alley stops, significantly reduces and minimizes noise generated by animals passing through a process alley having an example alley stop mounted therein to control the passage of animals therethrough.

Another advantage of the alley stops of the present disclosure is the reduction of balking or reversing of animals passing through the process alley. As will be described in more detail below, an example alley stop according to the present disclosure comprises a flat triangular arm component that at rest, protrudes into a process alley, and is easily deflected out of the process alley by an animal moving therethrough. The flat profile of the triangular arm component provides a minimal visual distraction to an animal moving into and through the process alley and consequently reduces the potential for startling and/or alarming the animal and causing it to stop and balk. Conventional alley stops typically use larger, more complex arms, which may cause animals to hesitate or stop when approaching the alley stop, thereby causing the livestock therebehind to balk and to try to back up and out of the process alley.

Further, as a result of the above-discussed advantages, it will be appreciated that the alley stops of the present disclosure may also reduce the time and the amount of labor required to process livestock, thereby providing a more cost-effective livestock processing system.

Further advantages will be discussed below and will be readily apparent to those of ordinary skill in the art upon reading the present disclosure.

As used herein, an "alley stop" refers to an assembly for preventing livestock from backing up in a process alley. As previously described herein, alley stops are generally configured to allow one-way passage of livestock through the process alley in a first desired direction while preventing them from moving through the process alley in a second opposite direction.

As used herein, "livestock" means animals raised in an agricultural setting to be used for labor and/or for commodities such as food, wool, leather, and the like. Non-limiting examples of livestock include cattle, goats, horses, pigs, sheep, and the like.

As used herein, a "process alley" or "process chute" refers to a corridor constructed for herding livestock from one location to another. The process alleys or chutes are configured to be wide enough that the livestock may pass through without issue but narrow enough that the livestock cannot turn around once in the alley. Typically, process alleys or chutes are formed from temporary or semi-permanent metal gates or members.

The term "hose" as used herein may also refer to tubing or conduit.

The term "collar" as used herein may also refer to clamp or clip.

The term "triangular arm component" as used herein refers to (i) a triangular piping assembly having a backward-facing deflection arm engaged at its distal end with the distal of a forward-facing backstop arm, with the proximal end of the backward-facing deflection arm is engaged with and near the proximal end of a bracing arm, and with the distal end of forward-facing backstop arm engaged with and near the distal end of the bracing arm.

The term "triangular arm component" as used herein also refers to a triangular flat plat arm component having a rearward-facing deflection side edge, a forward-facing backstop side edge, and a bracing sidewall. Triangular flat plat arm components may comprise polymeric sheet materials.

An example embodiment of demountable alley stops disclosed herein is illustrated in FIGS. 1-5. The example demountable alley stop 10 comprises a triangular arm component 20 that is hingedly engaged with an alley stop elongate framework 40 (FIG. 1), and is configured for demountable engagement with two horizontal side members of a process alley section or with a process chute section.

Figure 2:
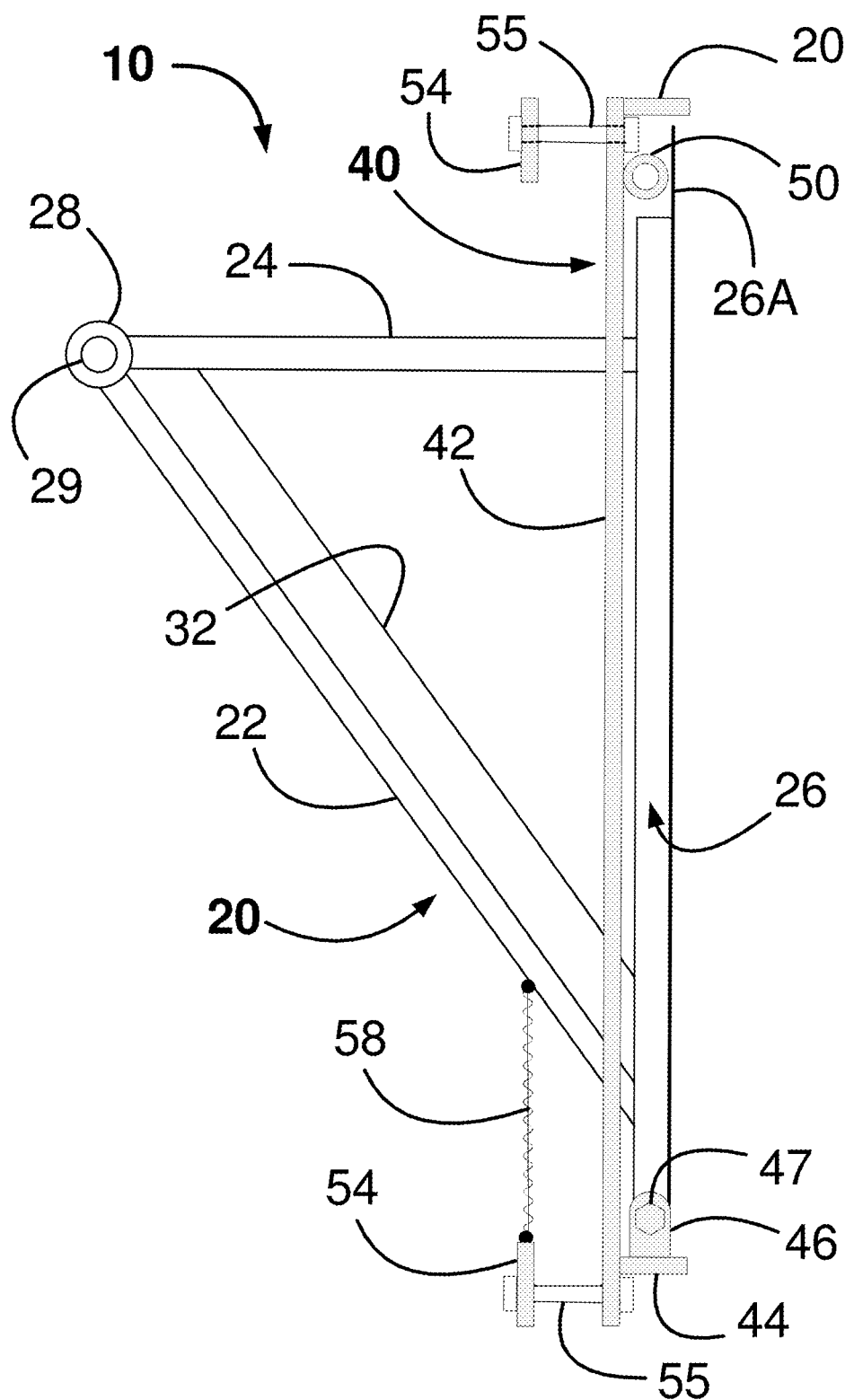
FIG. 2 is a detailed top view of the alley stop shown in FIG. 1 in the closed position.
Figure 3:
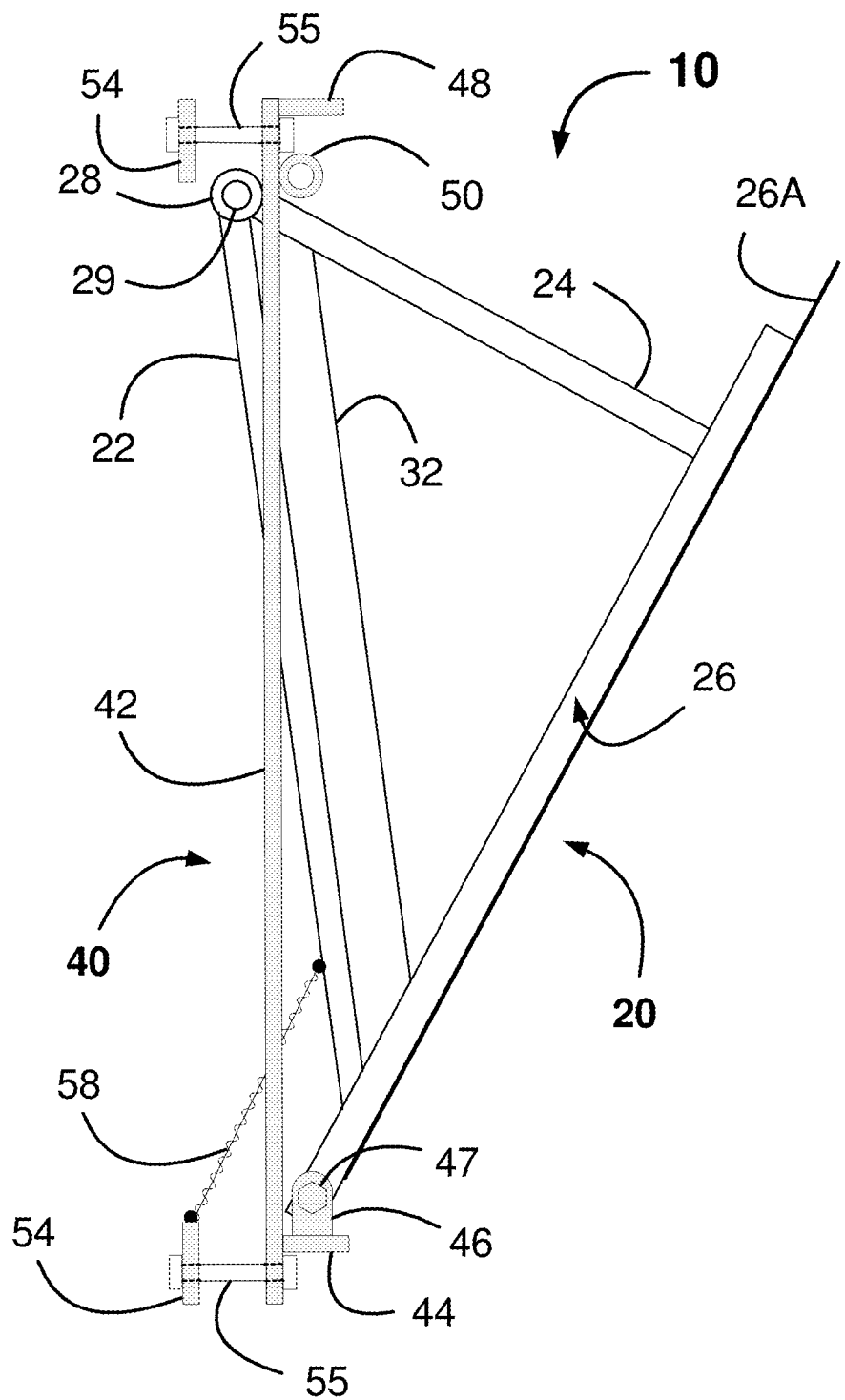
FIG. 3 is a detailed top view of the alley stop shown in FIG. 1 shown in an open position.

The triangular arm component 20 comprises a rearward-facing deflection arm component 22, a forward-facing backstop arm component 24, and a bracing arm component 26 (FIGS. 2, 3). The rearward-facing deflection arm component 22 is securely engaged at its distal end with a short section of pipe 28. The forward-facing backstop arm component 24 is also securely engaged at its distal end with the pipe 28 at an angle to the deflection arm component 22 selected from a range of about 35° to about 75°.

A suitable length for the pipe 28 is about the same as the width measurements of the rearward-facing deflection arm component 22 and the forward-facing backstop arm component 24. However, if so desired, the length of pipe 28 may be selected so that the pipe 28 extends above and below the juncture with the deflection arm component and the backstop arm component, by 1 cm or 2 cm or 3 cm or 4 cm or more. However, it is suitable to select a length for the pipe 28 that is less than the distance between two vertically adjacent horizontal members of process alley sections. The inner diameter of pipe 28 is preferably selected to receive therethrough, retain, and house therein a length of a resilient pliable hose 29. The length of resilient pliable hose 29 selected should be selected from a range of about 5 cm to about 30 cm longer than the distance between two vertically adjacent horizontal members of process alley sections. A suitable diameter for a resilient pliable hose 29 for insertion into and housing therein the pipe 28 may have an outside diameter (O.D.) selected from a range of about 1 inch to about 4 inches (about 2.5 cm to about 10.2 cm). Examples of suitable resilient pliable hoses 29 include rubber materials and/or polymeric materials and/or composite materials used in garden hoses or in larger-diameter flexible hosing for conveyance of water therethrough. A selected resilient pliable hose 29 may be retained within pipe 28 by inserting a screw through a bore provided therefor in the side of the pipe 28 and screwing the screw into the resilient pliable hose 29.

Figure 4:
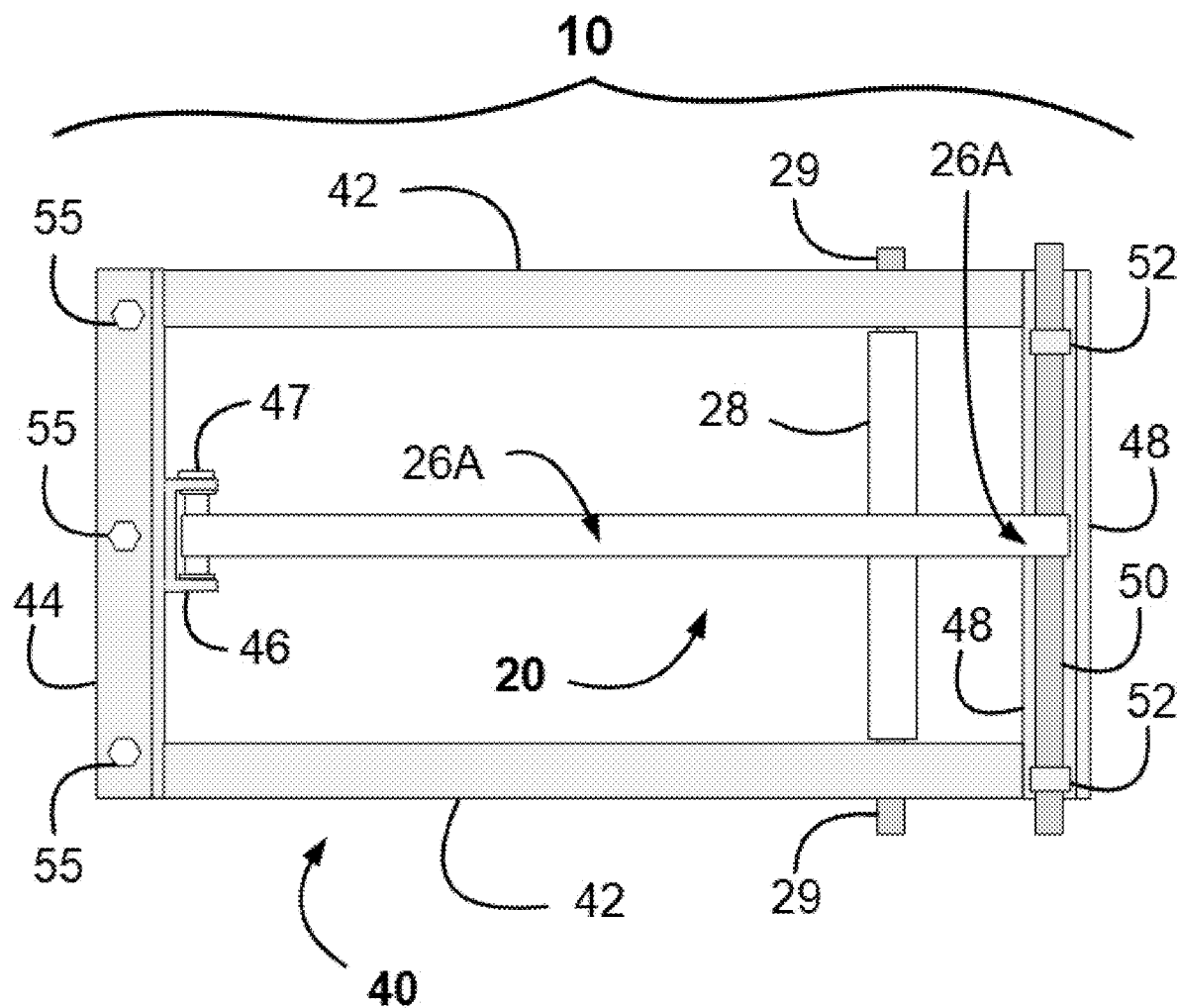
FIG. 4 is a side view of the alley stop shown in FIG. 1.

The proximal end of the rearward-facing deflection arm component 22 is securely engaged with the bracing arm component 26 at about approximate to or near to the proximal end of the bracing arm component 26 (FIGS. 2, 3). The proximal end of the forward-facing backstop arm component 24 is securely engaged with the bracing arm component 26 at about approximate to or near to the proximal end of the bracing arm component 26. The three securely engaged together arm components 22, 24, 26 form a rigid triangular arm component 20 having a relatively flat profile that provide a minimal visual profile and distraction to animals passing through a process alley or a process chute. It is optional if so desired, to provide a bracing bar element engaged with the inward-facing face of one or more of the arm components 22, 23, 24 to further add to the rigidity and durability of the triangular arm component 20. FIGS. 2, 3 show a bracing bar 32 securely engaged with the inward-facing surface of rearward-facing deflection arm component 22, engaged with and extending from the bracing arm component 26, and extending to and engaged with the pipe 28 and the forward-facing backstop arm component 24. The proximal end of the bracing arm component 26 is provided with a bore therethrough (not shown) for receiving therethrough a hinge pin 47 for hinged engagement with the alley stop elongate framework 40. The distal end of the bracing arm component 26 is provided with a flange 26A that extends outward from the distal end of the bracing arm component 26 for a selected distance. Suitable distances for the flange 26A to extend beyond the distal end of bracing arm component 26 are in the range of about 2 cm to about 15 cm and therebetween. The flange 26A may extend proximally along the entire length of the bracing arm component 26 as illustrated in FIGS. 2-4. Alternatively, the flange 26A may extend only partially toward the proximal end of the bracing arm component 26.

The example alley stop elongate framework 40 comprises two horizontal elongate frame members 42, a first vertical elongate frame member 44 securely engaged at its ends with the ends of the horizontal frame members 42, and a second vertical frame member 48 securely engaged at its ends with the opposite ends of the horizontal frame members 42 (FIG. 4). If so desired, the vertical elongate frame members 44, 48 may be flanges as illustrated in FIGS. 2, 3. The first vertical frame member 44 is provided with a hinge element 46 configured for receiving therein the proximal end of bracing arm component 26 whereby a hinge pin 47 can be inserted thereinto the hinge element 46 and through the bore hole provided therefor in the proximal end of the bracing arm component 26, to thereby rotationally engage the triangular arm component 20 and the alley stop elongate framework 40 (FIGS. 2, 3, 4). The second vertical frame member 48 is provided with a pair of vertically spaced-apart inline pliable hose-retaining collars 52 that are securely engaged to the vertical frame member 48. The inner diameter of the hose-retaining collars 52 is selected to receive thereto and to retain therein a selected resilient pliable hose 50. A bore may be provided in a side wall of each collar 52 for insertion of a screw therethrough and for screwing the screw into the resilient pliable hose 50 to retain it in place against the second vertical frame member 48. Suitable outer diameters for a resilient pliable hose 50 may be ½ inches or ⅝ inches or ¾ inches or an inch or 1¼ inches or 1½ inches and therebetween. It is optional for the hose-retaining collars to be substituted with clips or claims or the like. Examples of suitable resilient pliable hoses 50 for engagement with and retention therein the hose-retaining collars 52 include rubber materials and/or polymeric materials and/or composite materials used in garden hoses. The triangular arm component is secured into a closed resting position by a biasing spring 58 engaged at one end with the rearward-facing deflection arm component and at its other end, with the mounting bracket 54 engaged with the first vertical frame member 44 (FIGS. 2, 3).

Figure 6:
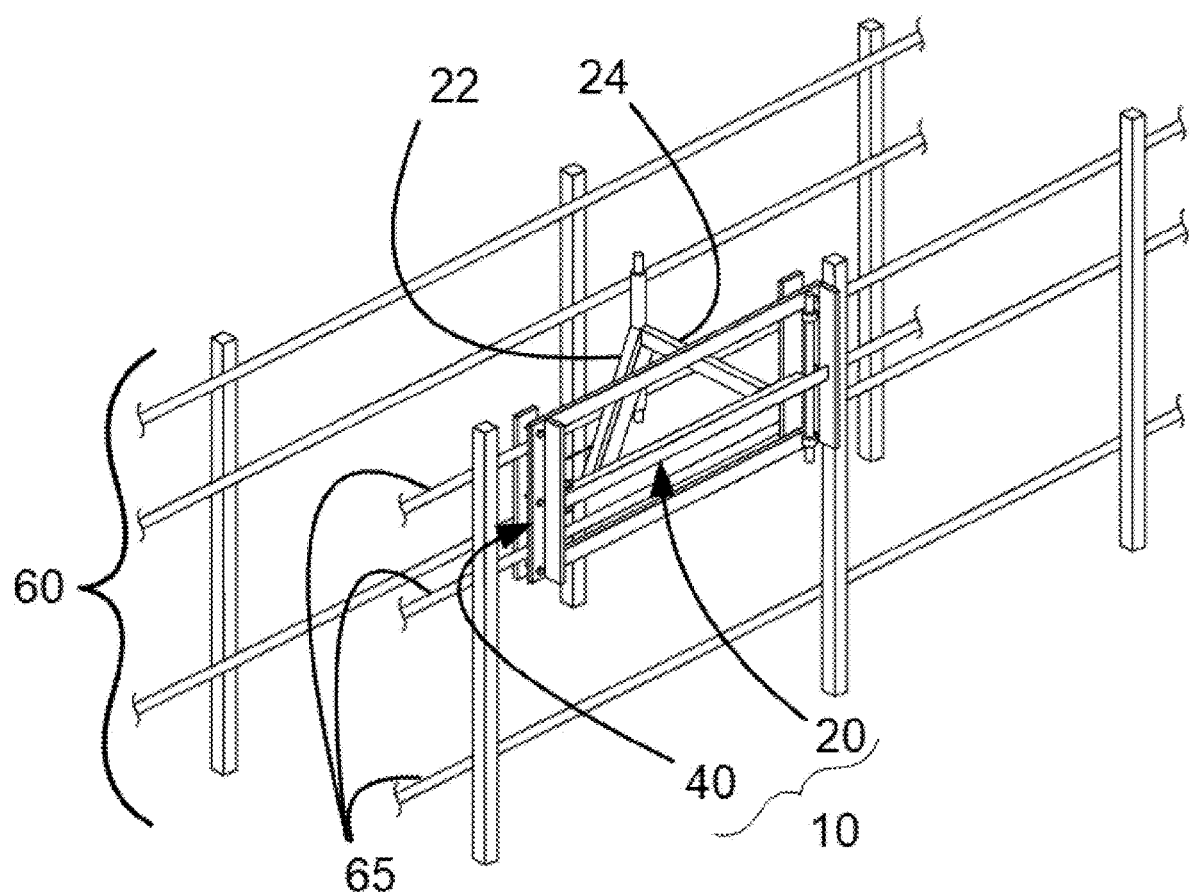
FIG. 6 is a perspective view of the alley stop in a closed position shown in FIG. 1, demountably engaged to two vertically adjacent horizontal side members on a livestock process alley.
Figure 7:
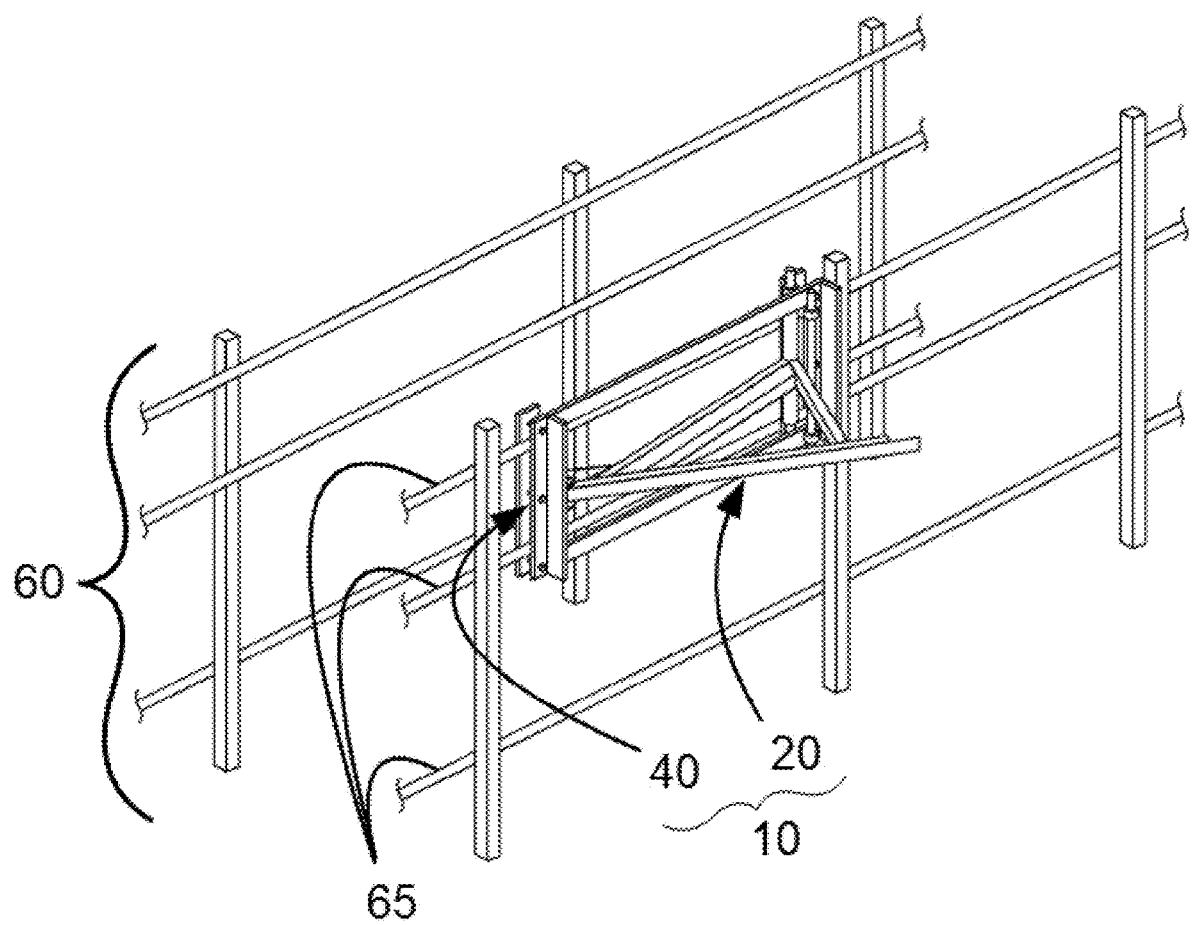
FIG. 7 is a perspective view of the alley stop shown in FIG. 6, in an open position.

The alley stops 10 disclosed herein may be demountably engaged with two vertically adjacent horizontal side rails 65 of a process alley 60 or chute as shown in FIGS. 6 and 7. The first and second vertical frame members 44, 48 are provided with a plurality of spaced-apart bores therethrough that correspond with a plurality of spaced-apart bores provided in a pair of elongate mounting brackets 54 (FIGS. 2, 3). The alley stop elongate framework 40 and the mounting brackets 54 may be positioned at a selected height on both sides of two vertically adjacent side rails 65 and then demountable secured in place with mounting bolts inserted therethrough the corresponding bores provided first and second vertical frame members 44, 48 and the mounting brackets 54 (FIGS. 2, 3, 4, 5A, 6). When the alley stop 10 is demountably engaged with two side rails 65 of the process alley 60, the resting position of the triangular arm component 20 extends into the process alley 60 with the leading edge of the rearward-facing deflection arm component 22 facing toward the entrance into the process alley 60 and the forward-facing backstop arm component 24 facing forward toward the exit end of the process alley 60 (FIGS. 5A, 6).

Figure 8A:
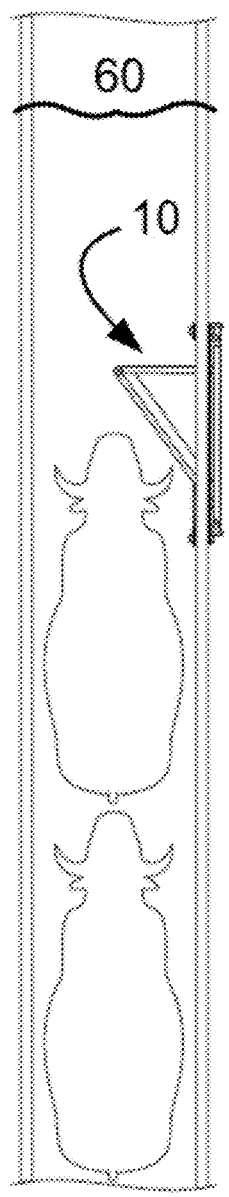
FIG. 8A shows animals approaching the alley stop.
Figure 8B:
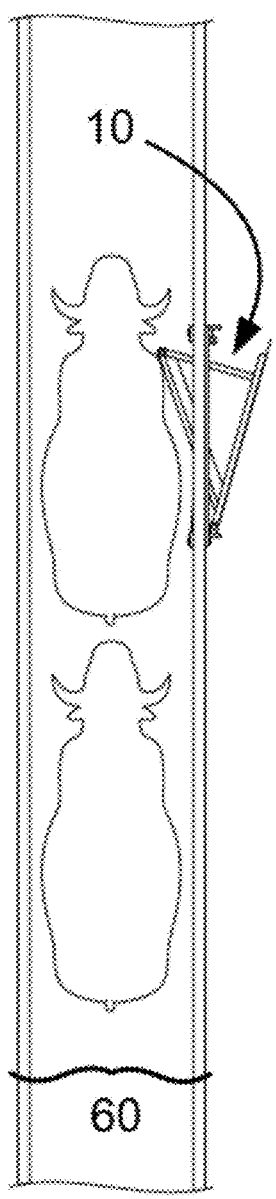
FIG. 8B shows a first animal moving through the alley stop.
Figure 8C:
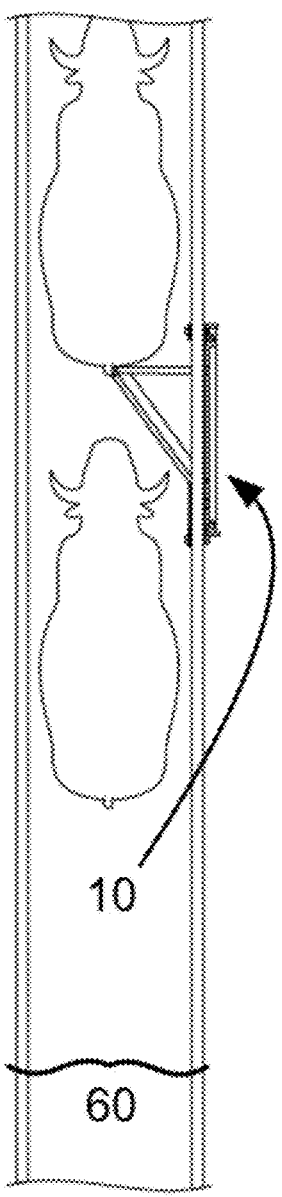
FIG. 8C shows the alley stop returned to a closed position between two animals after the first animal has passed by, and FIG. 8D shows the second animal to moving through the alley stop FIG. 9 are views of an alley stop component according to another embodiment of the present disclosure, shown in an exploded top view (FIG. 9A) and an assembled top view (FIG. 9B)
Figure 8D:
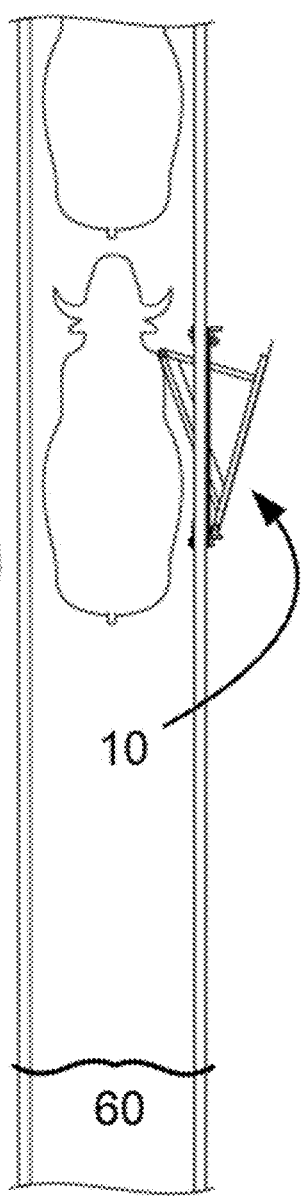

When a plurality of animals are herded to single file into the process alley 60 (FIGS. 6, 8A), the upper leg and/or shoulder of leading animal will come into contact with the leading edge of the rearward-facing arm component 22 of the triangular arm component 20 to thereby cause the triangular arm component 20 to hingedly rotate out of the process alley 60 until the two ends of the resilient pliable hose 29 extending out of the pipe 28 at the juncture of the rearward-facing deflection arm component 22 and the forward-facing backstop arm component comes into contact with the two horizontal side rails 65 (FIGS. 5B, 7, 8B). The force of the forward moving animal keep the triangular arm component 20 pressed against the inner side of the process alley 60 until the first animal has passed by the alley stop 10 at which time, the biasing spring 58 will immediately return the triangular arm component 20 to its resting position protruding into the process alley 60 (FIGS. 5A, 6, 8C). If the first animal attempts to back up in the process alley, its hind leg will come into contact with the leading edge of the backstop arm component 20 of the triangular arm component 20 which will remain firmly fixed in place by the bracing arm flange 26A in contact with the resilient pliable hose 50 secured in place by the hose-retaining collars 52 engaged with the second vertical frame member 48. The first animal will only be able to continue forward through the process alley 60, thereby providing space for the following animal to move forward whereby its upper leg and/or shoulder will come into contact with the leading edge of the rearward-facing deflection arm component 22 of the triangular arm component 20 to thereby cause the triangular arm component 20 to hingedly rotate out of the process alley 60 until the two ends of the resilient pliable hose 29 extending out of the pipe 28 at the juncture of the rearward-facing deflection arm component 22 and the forward-facing backstop arm component comes into contact with the two horizontal side rails 65 (FIGS. 5B, 7, 8B).

Herding livestock into process alleys for single-file transfer of individual animals therethrough causes high levels of incessant clanging and banging noises as each individual animal comes into contact with the alley stops currently in use because of the sharp metal on metal contact of the moving parts with the stationary parts of the alley stops. The loud banging and clanging sounds commonly startle individual animals who balk at the jarring sounds and then try to reverse to move away from the sources of the noises. Another advantage of the alley stops disclosed herein is that they are considerably quieter and thereby may reduce the incidents of balking and livestock crowding because, when an animal runs into the rearward-facing deflection arm component 22 of the triangular arm component 20 of alley stop 10, the triangular arm component 20 is forcibly moved out of the process alley until the resilient pliable hose 29 extending upward and downward from the pipe 28 at the juncture of the distal ends of the rearward-facing deflection arm component 22 and the forward-facing backstop arm component 24, contacts the side rails of a process alley with minimum noise (FIGS. 5B, 7, 8B, 8D). After an animal passes by the alley stop 10, the biasing spring 58 returns the triangular arm component 20 to its position which occurs when the bracing arm flange 26A comes into contact with the resilient pliable hose 50 secured to the vertical frame member 48. Incorporation of the resilient pliable hoses 29, 30 as contact points for the triangular arm component eliminates the occurrence of load metal-on-metal banging and clanging and minimizes noise production of the alley stop 10 when in use.

Another advantage associated with the alley stops disclosed herein is that they can be demountably engaged with any two vertically adjacent horizontal rails comprising a process alley or chute so that the leading edges of the forward-facing deflection arm component 22 and the rearward-facing backstop arm component 24 come into contact with the upper legs or chests of the taller animals being moved thereby and then as needed, demountably engaged with two lower vertically adjacent horizontal rails so that the upper legs or chests of shorter animals are contacted as they are being moved by.

According to some aspects of disclosure, the geometric size of the triangular arm assemblies 20 of the present alley stops 10 can be selected for use with certain types of process alleys or chutes, and also for the types of livestock animals that will be routine moved through and by the alley stops, by changing the lengths of the deflection arm component, the backstop arm component, and the bracing arm component. The geometric size of the triangular arm assemblies 20 may be sized such that they extend into process alley by about one third of the width of the process alley, or by about one half of the width of the process alley, or by about two thirds of the width of the process alley, or by about three quarters of the width of the process alley, or other selected portion of the process alley width. For example, suitable lengths for the backstop arm component include about 8",10",12",14",16", 18" (about 20.3 cm, 25.4 cm, 30.5 cm, 35.5 cm, 40.6 cm, 45.7 cm), and therebetween.

While it is suitable for the juncture at the distal ends of the deflectable arm component 22 and the backstop arm component of the triangular arm component to be an angle selected between about 25° and about 60°, it is preferable that the proximal end of the rearward-facing arm component 24 engages with the bracing arm component 26 at about 90°.

It is preferable that the geometry of the triangular arm component 20 is provided with a flat two-dimensional profile so that the triangular arm component 20 presents a minimal barrier view to an animal entering a process alley or chute to which the alley stop 10 is demountably engaged. A flat two-dimensional profile may significantly reduce animals' tendency to startle and/or balk and/or retreat as the approach the triangular arm component 20. According to some aspects, the deflection arm component 22, the backstop arm component 24, and the bracing arm component 26, may comprise flat bar steel stock, round tubular steel stock, square tubular steel stock, rectangular tubular steel stock, or the like, whereby the steel arm components may be welded together to form a triangular arm component according to the present disclosure. According to other aspects, the deflection arm component 22, the backstop arm component 24, and the bracing arm component 26, may comprise flat bar aluminum stock, round tubular aluminum stock, square tubular aluminum stock, rectangular tubular aluminum stock, or the like, whereby the aluminum arm components may be welded together to form a triangular arm component according to the present disclosure. According to other aspects, the triangular arm component 20 may be formed by casting or injecting a thermoset plastic or polymeric material into a mold provided therefor to thereby integrally form the deflection arm component 22, the backstop arm component 24, and the bracing arm component 26.

According to some aspects of the present disclosure, the leading edges of the rearward-facing deflection arm component 22 and the forward-facing backstop arm component 24 may be provided with optional sleeves of cushioning material to further reduce potential bruising injuries to animals' upper legs or shoulders when they come into contact with the triangular arm component 20 during forward movement or during attempts to back up. Suitable cushioning materials include foam, felt, and the like. Particularly suitable are various types of tubular insulation commonly used for insulating pipes. It is suitable for the walls of the sleeves of cushioning materials to have a cut therealong to enable easy installation and removal of the cushioning materials from about the deflection arm component and the backstop arm component.

As previously described, the resting position of a triangular arm 20 is biased to extend into the process alley 60. The biasing may be accomplished with a suitable spring 58, as shown in FIGS. 2 and 3. The biasing spring 58 may be demountably engaged with the deflection arm component 22 near the proximal end of the deflection arm component 22 with an engagement means provided therefor. Examples of engagement means for demountable engagement of the biasing spring 58 with the deflection arm component 22 include a bore through the deflection arm component 22 for hooking an end of the biasing spring therethrough or alternatively, securing then end of the biasing screw thereto with a bolt inserted through the bore and with a nut threaded thereonto. Other suitable engagement means for demountable engagement of an end of the biasing spring 58 to the deflection arm component 22 include a hook or a peg or a bracket provided therefor near the proximal end of the deflection arm component 22.

Figure 10:
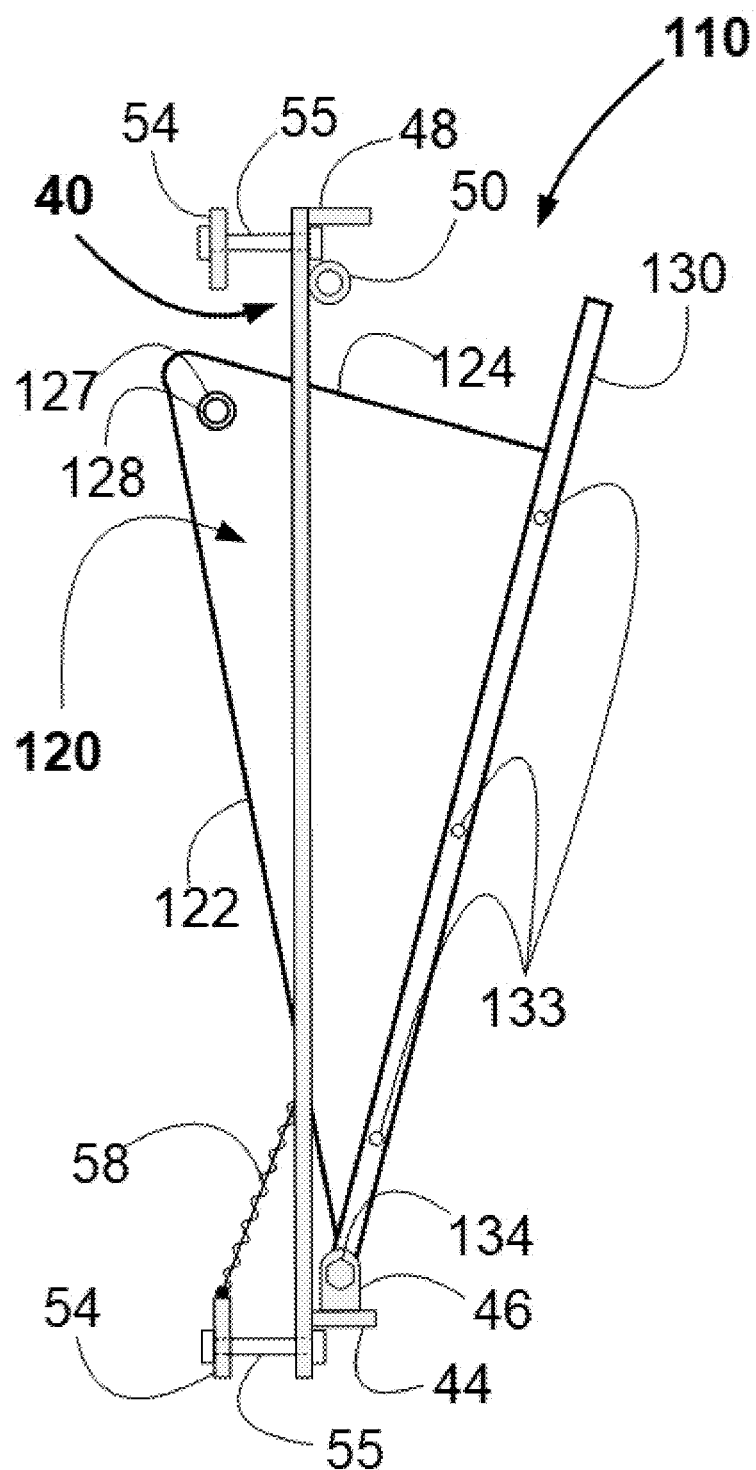
FIG. 10 is a top view of the alley stop component from FIGS. 9A and 9B, shown in cooperation with the alley stop framework, in an open position.

Another embodiment of an alley stop 110 according to the present disclosure is illustrated in FIGS. 9A, 9B, 10 and pertains to a triangular arm component 120 that may be used in cooperation with the alley stop framework 40 shown in FIGS. 1-5 in place of the triangular arm component 20. The triangular arm component 120 is similarly shaped and dimensioned as the triangular arm component 20. The triangular arm component 120 has a rearward-facing deflection side edge 122, a forward-facing backstop side edge 124, and a bracing sidewall 126. The juncture of the distal end of the rearward-facing deflection side edge 122 and the forward-facing backstop side edge 124, is preferably a rounded corner 123 to minimize injuries to livestock passing thereby. A bore 127 is provided through the triangular arm component 120 near the juncture of the distal end of the rearward-facing deflection side edge 122 and the forward-facing backstop side edge 124 to receive therethrough a length of a resilient pliable hose 128. The length of resilient pliable hose 128 selected should be selected from a range of about 5 cm to about 30 cm longer than the distance between two vertically adjacent horizontal members of process alley sections. A suitable diameter for a resilient pliable hose 128 for insertion into and housing therein the bore 127 may have an outside diameter (O.D.) selected from a range of about 1 inch to about 4 inches (about 2.5 cm to about 10.2 cm). Examples of suitable resilient pliable hoses 128 include rubber materials and/or polymeric materials and/or composite materials used in garden hoses or in larger-diameter flexible hosing for conveyance of water therethrough. A selected resilient pliable hose 128 may be retained within bore 127 by inserting a screw or a pin into, and optionally through, a bore provided therefor in the resilient pliable hose 128.

Suitable materials for the triangular arm component 120 may be selected from a variety of rigid and semi-rigid polymeric flat stocks having a thickness from a range of about ½", ¾", 1",1¼", 1½", 1¾", 2" (about 12.7 mm, 19.5 mm, 25.4 mm, 31.8 mm, 39.1 mm, 44.5 mm), and therebetween. Suitable examples include polyvinyl chloride (PVC) sheets, polyethylene terephthalate glycol (PETG) sheets, polycarbonate sheets, acrylic sheets, polyetherimide (PEI) sheets, polyetheretherketone (PEEK) sheets, polyamide imide (PAI) sheets, polyphenylene sulfide (PPS) sheets, polysulfone sheets, fluorinated ethylene polypropylene (FEP) sheets, poly(vinylidene fluoride) (PVDF) sheets, polytetrafluoroethylene (PTFE) sheets, high-density polyethene (HDPE) sheets, ultrahigh-density polyethylene (UHDPE) sheets, acrylonitrile butadiene styrene (ABS) sheets, nylon sheets, acetyl resin sheets, and the like.

The triangular arm component 120 is provided with a plurality of bores 129 spaced apart along the bracing sidewall 126 that align with bores 131 provided in a metal bracing arm component 130 to enable demountable engagement of the triangular arm component 120 to the metal bracing arm component 130 with bolts 132. The proximal end of the bracing arm component 130 extends beyond the juncture of the deflection side 122 and the bracing sidewall 126 of the triangular arm component 120, and is provided with a bore 132 for receiving a hinge pin 134 therethrough. The distal end of the bracing arm component 130 extends beyond the juncture of the backstop side 124 and the bracing sidewall 126 of the triangular arm component 120. Suitable materials for the bracing arm component 130 are metal U-channel stock and angle iron stock. Suitable metals include aluminum, steel, steel alloys, zinc alloys, and the like.

When assembled with the alley stop framework 40 by insertion of a hinge pin 134 through the hinge 46 and the hinge pin bore 132 of the bracing arm component 130, and by engagement of the biasing spring 58 with a mounting bracket 54 and the deflection side edge 122 of the triangular arm component 120, the biasing spring 58 biases the distal end of the bracing arm component 130 against the resilient pliable hose flange stop 50 of the alley stop framework 40 in a resting position. When a pressure is exerted against the deflection side edge 122, the triangular arm component 120 will be deflected toward away from the resilient pliable hose flange stop 50 until the resilient stop component 128 extending through and out from the triangular arm component 120 (as shown in FIG. 10) comes into contact with a horizontal rail (not shown) to which the alley stop framework 40 is attached. As soon as the pressure is removed from the deflection side edge 122, the biasing spring 58 will return the triangular arm component 120 to its resting position with distal end of the bracing arm component 130 against the resilient pliable hose flange stop 50.

In the present disclosure, all terms referred to in singular form are meant to encompass plural forms of the same. Likewise, all terms referred to in plural form are meant to encompass singular forms of the same. Unless defined otherwise, all technical terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

NUMBER KEY 10 alley stop 58 biasing spring
20 triangular arm component 60 process alley
22 deflection arm component 65 side rails
24 backstop arm component 110 alley stop
26 bracing arm component 120 triangular arm component
26A bracing arm flange 122 deflection side edge
28 pipe 123 rounded corner
29 resilient stop component 124 backstop side edge
32 bracing bar 126 bracing sidewall
40 alley stop framework 127 bore
42 horizontal frame member 128 resilient stop component
46 hinge 129 bracing edge bores
47 hinge pin 130 bracing arm component
48 vertical frame member 131 plate mounting bores
50 resilient pliable hose flange stop 132 hinge pin bore
52 hose-retaining collars 133 bolts
54 mounting brackets 134 hinge pin
55 mounting bolts

The invention claimed is:

1. A demountable alley stop for preventing livestock from backing up in a process alley, the alley stop comprising:
   a triangular arm component comprising:
      a rearward-facing deflection arm component;
      a forward-facing backstop arm component; and
      a bracing arm component with a distal end having a flange extending outward therefrom and a proximal end configured for a hinged engagement;
      wherein a distal end of the deflection arm component and a distal end of the backstop arm component are engaged with a pipe section configured for receiving therethrough and retaining therein a first resilient pliable hose, and
   wherein a proximal end of the deflection arm component is engaged with the bracing arm component toward the proximal end of the bracing arm component, and
   wherein a proximal end of the backstop arm component is engaged at a right angle with the bracing arm component toward the distal end of the bracing arm component; and
   an alley stop framework comprising:
      an upper horizontal frame member;
      a lower horizontal frame member;
      a first vertical frame member engaged at its opposite ends with a distal end of the upper frame member and a distal end of the lower frame member, said first vertical frame member configured for the hinged engagement with the proximal end of the bracing arm component; and
      a second vertical frame member engaged at its opposite ends with a proximal end of the upper horizontal frame member and a proximal end of the lower horizontal frame member, said second vertical frame member having two vertically spaced apart collars configured for receiving therethrough and retaining therein a second resilient pliable hose;
   a pair of mounting brackets configured for demountable engagement with the first and second vertical frame members;
   wherein the deflection arm component and one or both of the pair of mounting brackets are configured for engagement with a biasing spring; and
   whereby when the alley stop framework and pair of mounting brackets are demountably engaged about two vertically adjacent horizontal rails of the process alley, and the triangular arm assembly is hingedly engaged with the alley stop framework, and the first end of the biasing spring is engaged with the deflection arm component and the second end of the biasing spring is engaged with the mounting bracket engaged with the first vertical framework, the flange at the distal end of the bracing arm component is biased against the second resilient pliable hose.

2. The alley stop according to claim 1, additionally comprising one or both of the first and second resilient pliable hose.

3. The alley stop according to claim 1, additionally comprising one or more elongate cushioning sleeves for demountable engagement with the triangular arm component.

4. The alley stop according to claim 1, wherein the frame members comprising the alley stop framework are fabricated from steel stock or aluminum stock.

5. The alley stop according to claim 1, wherein the triangular arm component is fabricated from steel stock or aluminum stock.

6. The alley stop according to claim 1, wherein the triangular arm component is cast or molded as an integrally molded assembly with a thermoset plastic or a thermoset resin.

7. The alley stop according to claim 1, wherein the triangular arm component is configured from a polymeric flat stock.

8. The alley stop according to claim 1, wherein the triangular arm component is provided with an angle at a juncture of the distal ends of the deflection arm component and the backstop arm component, selected from a range of 25° to 75°.

9. A kit of parts for a demountable alley stop according to claim 1, for demountable engagement with two vertically adjacent frame rails of a process alley, the kit of parts comprising:
   the triangular arm component;
   the alley stop framework; and
   a pair of mounting brackets.

10. The kit according to claim 9, additionally comprising one or more lengths of demountable cushioning sleeves.

11. The kit according to claim 9, wherein the frame members comprising the alley stop framework are fabricated from steel stock or aluminum stock.

12. The kit according to claim 9, wherein the triangular arm component is fabricated from steel stock or aluminum stock.

13. The kit according to claim 9, wherein the triangular arm component is cast or molded with a thermoset plastic or a thermoset resin.

\* \* \* \* \*